US012489769B2

United States Patent
Koral

(10) Patent No.: US 12,489,769 B2
(45) Date of Patent: Dec. 2, 2025

(54) SYSTEM AND METHOD FOR IDENTIFYING COMMUNICATIONS NETWORK ANOMALIES OF CONNECTED CARS

(71) Applicant: AT&T Intellectual Property I, L.P., Atlanta, GA (US)

(72) Inventor: Yaron Koral, Cherry Hill, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 445 days.

(21) Appl. No.: 17/878,337

(22) Filed: Aug. 1, 2022

(65) Prior Publication Data
US 2024/0039937 A1   Feb. 1, 2024

(51) Int. Cl.
*H04L 67/12* (2022.01)
*H04L 9/40* (2022.01)
*H04L 41/06* (2022.01)
*H04L 41/16* (2022.01)

(52) U.S. Cl.
CPC .......... *H04L 63/1425* (2013.01); *H04L 41/06* (2013.01); *H04L 41/16* (2013.01); *H04L 63/1441* (2013.01); *H04L 67/12* (2013.01)

(58) Field of Classification Search
CPC ..... H04L 41/06; H04L 41/16; H04L 63/1425; H04L 63/1441; H04L 67/12
See application file for complete search history.

(56) References Cited

U.S. PATENT DOCUMENTS

| | | | |
|---|---|---|---|
| 8,903,593 B1* | 12/2014 | Addepalli | G06F 9/542 |
| | | | 701/30.6 |
| 11,526,167 B1* | 12/2022 | Konrardy | G05D 1/692 |
| 2014/0096249 A1* | 4/2014 | Dupont | G06F 21/00 |
| | | | 726/23 |
| 2016/0112216 A1* | 4/2016 | Sargent | G07C 5/008 |
| | | | 370/328 |
| 2019/0380037 A1* | 12/2019 | Lifshitz | H04W 12/122 |
| 2019/0387021 A1* | 12/2019 | Wyatt | H04L 63/1466 |
| 2022/0167147 A1* | 5/2022 | Karimli | H04W 4/50 |

(Continued)

OTHER PUBLICATIONS

"Black Boxes Fact Sheet", www.motorists.org, Prepared by the National Motorists Association, Jul. 29, 2022, 1 pg.

(Continued)

*Primary Examiner* — Glenton B Burgess
*Assistant Examiner* — Patrick F Ngankam
(74) *Attorney, Agent, or Firm* — Guntin & Gust, PLC; Mark Wilinski

(57) ABSTRACT

Aspects of the subject disclosure may include, for example, a device, having a processing system including a processor; and a memory that stores executable instructions that, when executed by the processing system, facilitate performance of operations, including gathering and aggregating historical data provided to an APN gateway of a connected car manufacturer and a packet core of a communications network; using the historical data gathered and aggregated to train a ML model to recognize anomalies from the historical data, thereby creating a trained ML model; monitoring current data provided to the APN gateway and the packet core; and generating an alert when the trained ML model recognizes an anomaly. Other embodiments are disclosed.

20 Claims, 9 Drawing Sheets

(56) References Cited

U.S. PATENT DOCUMENTS

2022/0167171 A1* 5/2022 Iapalucci ............ H04L 43/0888
2022/0359087 A1* 11/2022 Lakhtakia .............. G16H 50/70

OTHER PUBLICATIONS

"Event Data Recorder Vehicle List", www.rimkus.com, Jan. 1, 2001, 4 pgs.
"Hackers control connected cars using text messages", https://www.engadget.com/2015-08-11-obd-ii-text-message-car-hack.html, Engadget.com, Jun. 28, 2022, 1 pg.
Hyde, Greg, "New Hack Controls Car with SMS", https://www.tu-auto.com/new-hack-controls-car-with-sms/, Aug. 13, 2018, 2 pgs.
Walford, Lynn, "Car Hacking Village People Hack Infotainment, Control Cars by SMS & Exploit Vulnerabilities in QNX", https://www.autoconnectedcar.com/2018/08/car-hacking-village-people-hack-infotainment-control-cars-by-sms-exploit-vulnerabilities-in-qnx/, Aug. 13, 2018, 4 pgs.

* cited by examiner

SYSTEM AND METHOD FOR IDENTIFYING COMMUNICATIONS NETWORK ANOMALIES OF CONNECTED CARS

FIELD OF THE DISCLOSURE

The subject disclosure relates to a system and method for identifying communications network anomalies of connected cars.

BACKGROUND

A modern vehicle is a de-facto "connected car," i.e., a vehicle communicating operational and other data wirelessly through a communications network. It is expected that the number of connected cars will exceed 100 million over the next five years, compared to roughly 30 million connected cars at the time of this filing.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for a mobility threat analytics platform. Embodiments are disclosed for a dedicated platform for connected cars that can consider the unique characteristics of a car compared to a person or some other IoT device. The value of such a platform is derived from the increased risks involve with automated operational controls and other considerations, as a compromised connected car may be subject to attacks that may risk a driver's safety and potentially lead to a fatal accident. Other embodiments are described in the subject disclosure.

One or more aspects of the subject disclosure include a device, having a processing system including a processor; and a memory that stores executable instructions that, when executed by the processing system, facilitate performance of operations, including gathering and aggregating historical data provided to an access point name (APN) gateway of a connected car manufacturer and a packet core of a communications network; using the historical data gathered and aggregated to train a machine-learning (ML) model to recognize anomalies from the historical data, thereby creating a trained ML model; monitoring current data provided to the APN gateway and the packet core; and generating an alert when the trained ML model recognizes an anomaly.

One or more aspects of the subject disclosure include a non-transitory, machine-readable medium with executable instructions that, when executed by a processing system including a processor, facilitate performance of operations of collecting historical data provided to an APN gateway of a connected car manufacturer; training an ML model to recognize anomalies from the historical data, thereby creating a trained ML model; monitoring current data provided to the APN gateway; and generating a report when the trained ML model recognizes an anomaly.

One or more aspects of the subject disclosure include a method of collecting, by a processing system including a processor, historical data provided to an APN gateway of a connected car manufacturer, wherein the APN gateway comprises a telematics APN gateway, an entertainment APN gateway, an Internet hotspot APN gateway, or a combination thereof; training, by the processing system, a ML model to recognize anomalies from the historical data, thereby creating a trained ML model; monitoring, by the processing system, current data provided to the APN gateway; and generating, by the processing system, an alert when the trained ML model recognizes an anomaly, wherein the anomaly comprises extreme volumetric changes, signal quality of service issues, massive disconnects, short message service inconsistencies, location-related issues, or a combination thereof.

Figure 1:
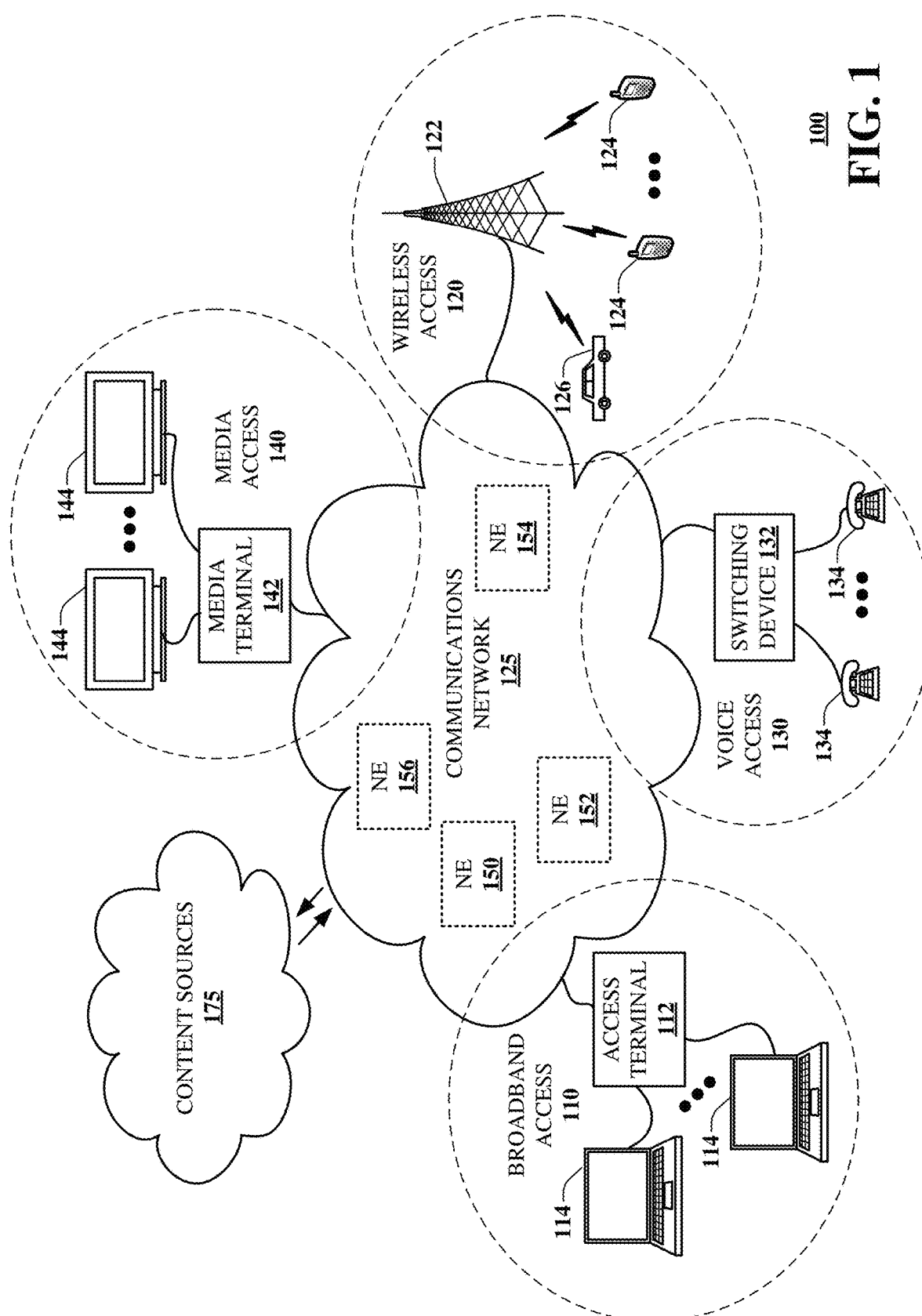
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part gathering and aggregating historical data provided to an access point name (APN) gateway of a connected car manufacturer; using the historical data gathered and aggregated to train a ML model to recognize anomalies from the historical data, thereby creating a trained ML model; monitoring current data provided to the APN gateway; and generating an alert when the trained ML model recognizes an anomaly. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a fourth-generation (4G) Long Term Evolution (LTE), fifth generation (5G), or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G LTE, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

A connected car is exposed to network interfaces that supply several services. Some services may expose remote control capabilities over sensitive elements such as ignition, door locks, or climate control system. A security compromise, i.e., hacking of communications, may pose a risk of car theft or an accident, possibly fatal, which is a huge liability for automotive manufacturers and insurers. Other threats may be less severe but may involve unauthorized disclosure of a car's location, disabling emergency calls or other communications, and fraudulent abuse of Internet services. Identifying and protecting against these risks requires specific knowledge of the connected car, the services that the connected car is exposed to, and communication methods. The system and methods described herein provide anomaly detection and threat identification for connected cars, in an effort to counteract the above-identified threats in this domain. Other solutions may focus on enterprise security or consumer cellular telephony, which are different problems in similar, but different communications domains.

The system and methods described herein can identify network anomalies in the domain of connected cars. These anomalies may indicate some benign variation from normal, but they may also suggest some operational fault or malicious attack. The system is designed to identify potential attacks while not creating too many false alarms. For this purpose, the system employs machine learning techniques to characterize the expected, normal behavior of connected cars uniquely and to further specialize and learn the unique network characteristics of each car brand. Particular aspects related to connected cars and a potential attack or threat can be indicated for each anomaly detected.

Figure 2A:
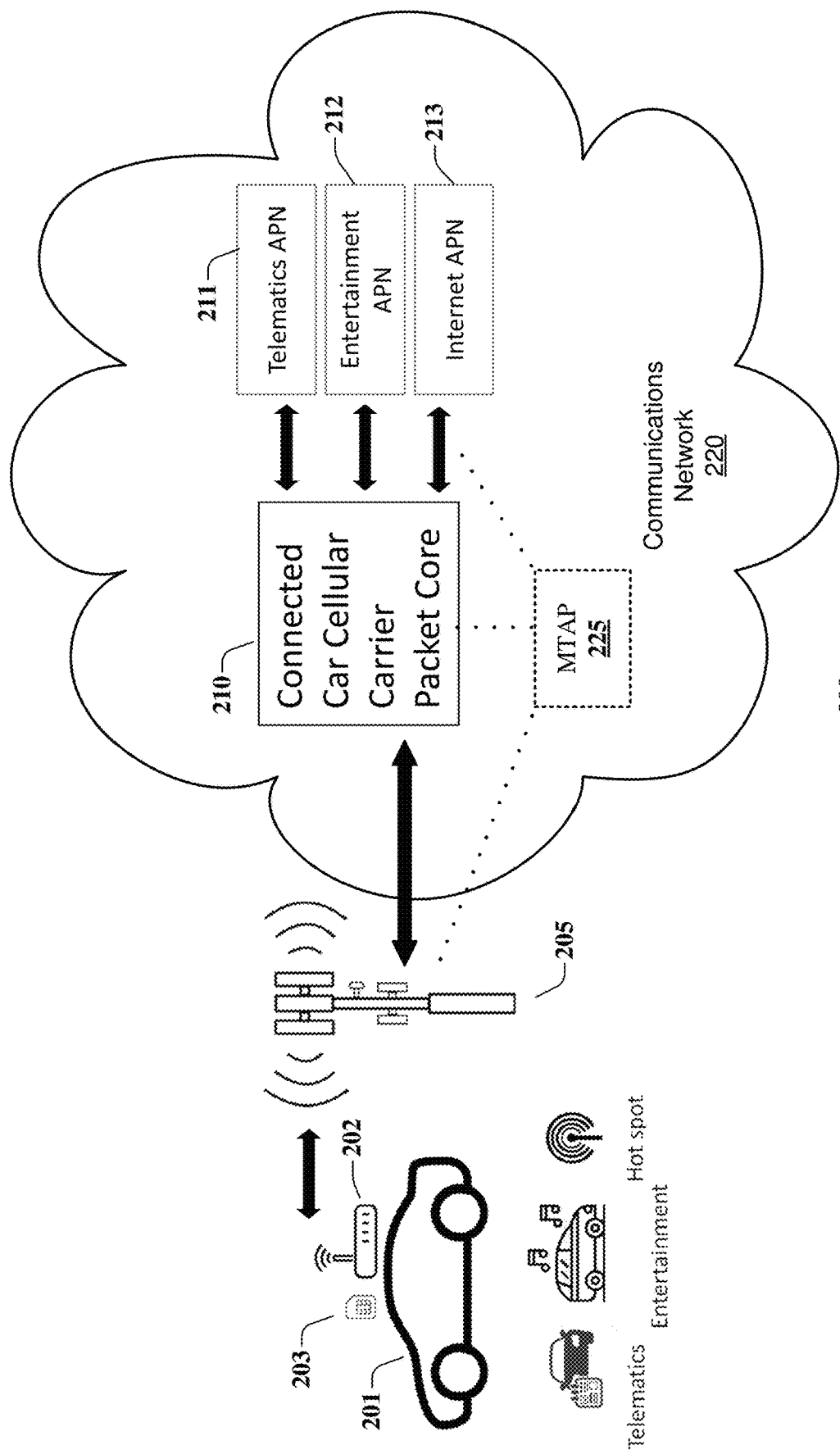
FIG. 2A is a block diagram illustrating an example, non-limiting embodiment of a connected car anomaly detection system functioning within the communication network of FIG. 1 in accordance with various aspects described herein.

FIG. 2A is a block diagram illustrating an example, non-limiting embodiment of a connected car anomaly detection system functioning within the communication network of FIG. 1 in accordance with various aspects described herein. As shown in FIG. 2A, system 200 comprises a connected car 201 comprising a cellular modem 202 that supports a cellular communication type (e.g., 3G, 4G LTE and maybe even 5G or a higher generation). Additionally, the vehicle has a SIM card 203, or other information storage component, such as an eSIM, that carries a unique subscriber identifier. FIG. 1 also shows a radio access network cell site 205 that carries the communications traffic and a packet core 210 that services the connected cars and other cellular devices. The connected car cellular carrier packet core 210 relays communications to one or more dedicated APN gateways. FIG. 1 illustrates the connected car 201, the cellular modem 202, the SIM card 203 and the different network services used. These services are examples of common ones used but some car manufacturers provide additional network services. In an embodiment, a telematics APN 211, an entertainment APN 212, and an Internet hotspot APN 213 gateway are illustrated, each of which forwards the communications traffic to a dedicated service (not shown). Other service APN gateways are contemplated. System 200 further comprises a mobility threat analytics platform (MTAP 225), which is preferably implemented as a network element in communications network 250 and is described in more detail below.

Both the cellular modem 202 and the SIM card 203 are usually molded to the engine and are not easily removed. The cellular modem 202 enables communication for the vehicle computer, the entertainment system, the vehicle hotspot, and other services. Some carriers use a dedicated packet core for connected cars, while others use a shared packet core with other traffic. A dedicated packet core, such as connected car cellular carrier packet core 210, creates some barrier between the connected cars traffic to some additional traffic, making it harder to conduct attacks from devices outside the dedicated, connected cars packet core. Still, attackers may breach this barrier. Therefore, it is still part of an attack surface for the connected cars.

MTAP 225 supports a set of analytics modules that detect connected car-related threats or anomalies. Each module operates in one of the two modes: per-device mode or aggregated mode. The per-device mode identifies anomalies or threats related to a specific device. In contrast, the aggregated mode identifies anomalies or threats to the entire car population of a particular car make. The aggregated mode can create alerts or reports related to one of the services of the car make, which is identified by the APN ID. For example, such alerts may be focused on traffic of the telematics APN 211. These include GPS systems, onboard vehicle diagnostics, wireless telematics devices, and event data recorder (black box) technologies.

Monitoring network anomalies for connected cars requires several network points of view. Usually, different collection systems and probes collect the data from various points in the network. MTAP 225 analytics modules employ three primary data collection systems:

radio access network (RAN) collection captures the signal quality and device location attributes as well as data volume.

Control Plane Collection: captures device authentication and network attack attempts, APN mismatches, and SIM card mismatches. Control data is used to manage device connectivity to the communications network.

Data Plane Collection: captures volumetric data anomalies and malware or botnet connections. This data is sent to the APNs.

MTAP 225 can analyze multiple types of network identifiers. A first type of identifier can be an international mobile subscriber identity (IMSI), which is located at the SIM card 203 and serves as a unique subscriber identifier. A subscriber may carry a SIM card from one phone to another. However, in the case of connected cars, the SIM card 203 and the IMSI remain with the connected car 201 and the cellular modem 202. A second type of identifier can be an international mobile equipment identity (IMEI), which is part of the cellular modem 202 and uniquely identifies the cellular modem 202. The IMEI cannot be changed after being allocated. A third type of identifier can be a type allocation code (TAC) identity, which is the first eight digits of the IMEI. The TAC uniquely identifies the make and model of the modem. Usually, a car manufacturer uses a small set of modem models. Therefore, the TAC can help identify the network traffic of a particular car make. A fourth type of identifier can be an APN identity. Usually, the same APNs are attributed to a particular brand of car. But a manufacturer has a many-to-one relationship with APNs. So, each APN has one car brand, while a car brand may have more than one APN. The multiple APNs are used to provide different services. This identifier is crucial when applying learning patterns to characterize traffic behavior since traffic behavior varies significantly between assorted services.

Output presentation plays an important role of the system. Some of the abovementioned anomalies generate a textual alert, but for others, text alerts may cause a lot of noise. When there are too many alerts, the security operator tends to ignore them. Therefore, there are two primary output artifacts to the systems: alert and report. Both alerts and reports are used for each anomaly detection module.

An alert can be generated no more than a predefined rate. For example, a typical rate would be at most one alert per 5 minutes. If there are more anomalies than the predefined rate allows, they can be aggregated into a 5-minute alert, although other time periods can be used. Furthermore, an anomaly alert can be accompanied by a graph showing abnormal behavior compared to a typical behavior. For example, a volumetric data usage anomaly of 500 GB is detected, which can be accompanied by a diagram that shows the expected behavior of 1.3 GB on average. For location-related abnormalities, the alert can include a map, if applicable.

A report artifact is essential to capture trends and changes in normal behavior over time. Furthermore, the report artifact adds the time aspect that the alert artifact misses. For example, an operator may dismiss an alert message. Still, a monthly report may identify that a similar alert message appeared a few hundreds of times, which may change its importance.

Some vehicle vendors maintain a security information and event management (STEM) dashboard. This system consumes anomaly alerts and reports and already implements the presentation layer. Therefore, if a STEM dashboard exists, the alerts and reports can contain only the information, and there may be no need to supply graphical elements.

Figure 2B:
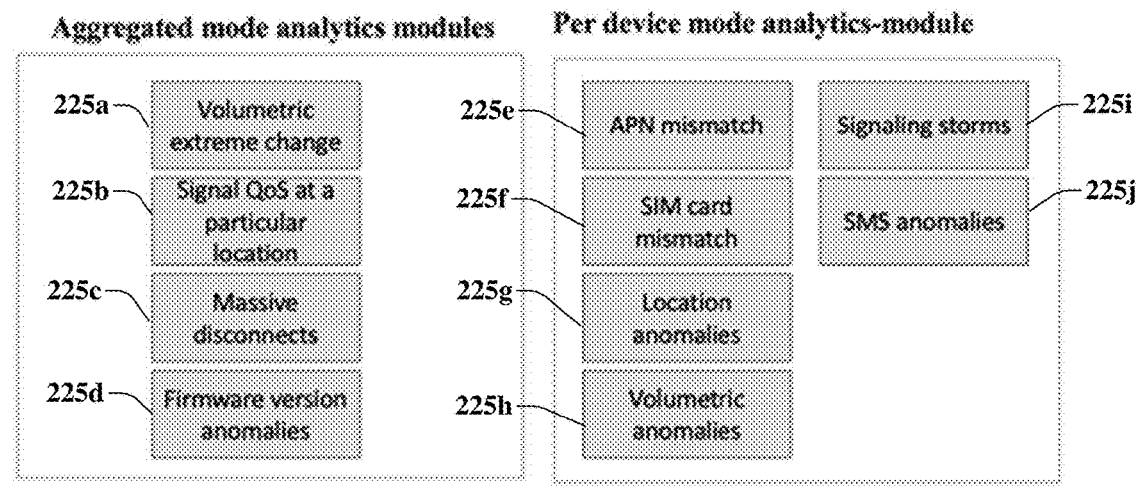
FIG. 2B is a block diagram illustrating exemplary analytics modules embedded within the mobility threat analytics platform of FIG. 2A in accordance with various aspects described herein.

FIG. 2B is a block diagram illustrating exemplary analytics modules embedded within the mobility threat analytics platform of FIG. 2A in accordance with various aspects described herein. As shown in FIG. 2B, there are two types of analytics modules, those that operate in an aggregated mode and those that operate in a per-device mode. The modules represent a baseline of threat analytics and anomaly detection for connected cars. The number and variety of modules can be extended based on specific needs of a connected car manufacturer. Aggregated mode modules include a volumetric extreme change module 225a, a signal quality of service (QoS) module 225b, a massive disconnects module 225c, and a firmware version anomalies module 225d. Per-device mode modules include an APN mismatch module 225e, a SIM card mismatch module 225f, a location anomalies module 225g, a volumetric anomalies module 225h, a signaling storms module 225i, and a short message service (SMS) module 225j.

Volumetric extreme change module 225a analyzes an aggregated count of uploaded and downloaded amounts of data (bytes) of all cars of a certain brand. Furthermore, for a certain car brand, the module tracks separately each APN that is related to the car brand. In an embodiment, volumetric extreme change module 225a measures the aggregate count during a five-minute interval and generates alerts for intervals no smaller than 15 minutes (e.g., intervals to identify extreme volumetric change can be 30 minutes and above). The definition or threshold of an 'extreme volumetric change' depends on the car brand and the APN. Some APNs are more predicted than others and may be more sensitive than others. For example, saturation of the telematics APN 211 may be more critical to the car function than the Internet hotspot APN 213.

Using common techniques such as alerting when a volumetric change exceeds three times standard deviation, would result in many false alerts. See FIG. 2C below. Instead, volumetric extreme change module 225a compares the normal change in terms of number of standard deviations for time windows of 5, 10 and 15 minutes over the past 14 days at the same time of day. For example, a measurement of the uploaded bytes in between 10:05-10:10 a.m. today is compared with the same time window over the past 14 days. Three standard deviation change is usually a good measure to generate an alert. Still, the volumetric behavior can be detected by a ML model and adjusted for each car brand and each APN separately.

An extreme increase in volume may indicate an attack or a malware that tries to overload the APN to cause a denial-of-service (DoS). An extreme drop of traffic may indicate that an attack on the APN has already happened, and the APN has already been brought down, therefore, the vehicles cannot communicate with the APN.

Figure 2C:
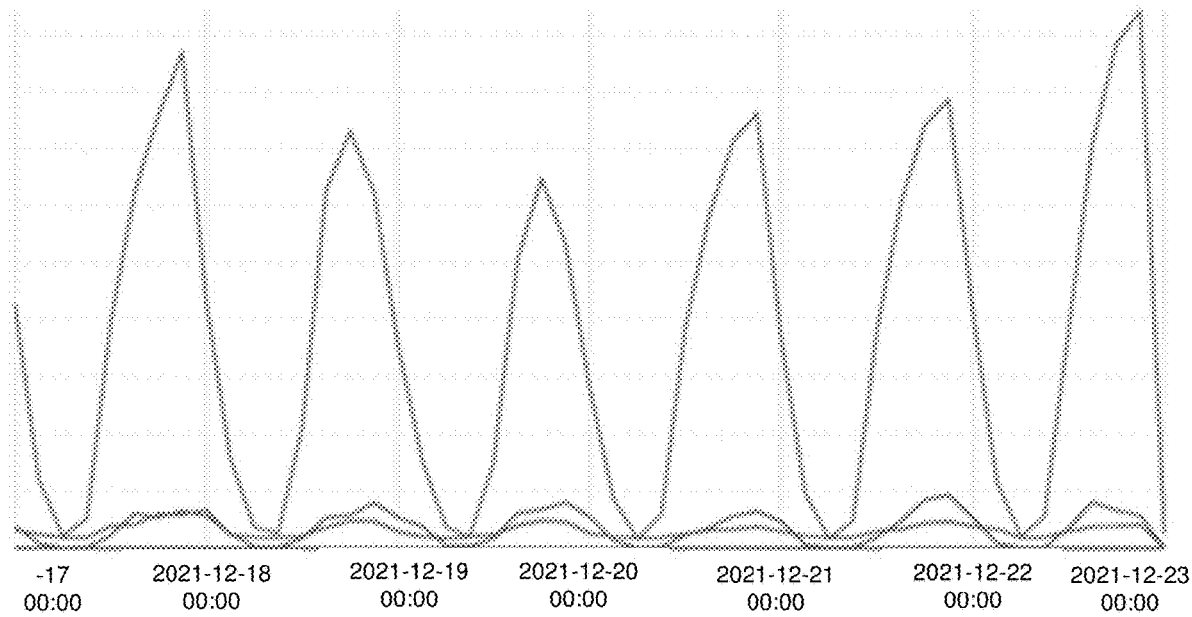
FIG. 2C is a graph illustrating diurnal variation in data rates for access point names observed in the connected car cellular carrier packet core in accordance with various aspects described herein.

FIG. 2C is a graph illustrating diurnal variation in data rates for APNs observed in the connected car cellular carrier packet core 210 in accordance with various aspects described herein. As shown in FIG. 2C, the data rates of each of the APNs varies with the daily usage of the connected cars. A normal behavior observed over several APNs and several car brands is a periodic one over a cycle of 24 hours. Weekends and holidays have an effect as well, but not as notable as the daily effects. One of the unique characteristics is that there is a normal extreme volumetric change between day and nighttime.

Returning to FIG. 2B, a ML model can find volumetric offenders by matching to some threshold. The ML model can learn to distinguish one-time events from repetitive ones. Also, some one-time events of a single car may be repetitive if comparing across many cars. The classification of such event without knowing properties in advance requires a multi-variant or neural network analysis such as auto encoder, to take into account the different variables that may have caused the spike in traffic.

The ML model receives RAN events data records as inputs to the ML model, including events of data transmission for each individual car. Parameters include a timestamp, upload data volume, download data volume, service/APN for the data. The ML model generates a report, issued periodically, of the volume of data usage and probability of an anomaly, along with a list of connected cars that had an abnormal volume of data usage, as output. In an embodiment, the report includes data upload and data download level of the offending car. The report may also include the average among all cars of the certain vendor and the monitored service. The report may also include a list of repetitive offenders, those who appeared in the report over a certain number of days over the past month (e.g., default of 5 days). The ML model may take a month or more to adequately train on the statistical characteristics of data usage, including average volume per time of day, average volume per location, standard deviation, traffic trends (increase/decrease). The volumetric offender's data usage is assumed to be higher than average by more than 1,000 times standard deviation. Also, the number of offenders is assumed to be insignificant in terms of overall average calculations, therefore it is assumed not to interfere with the training. Since the ML algorithm is based on unsupervised learning the common case is assumed to represent normal traffic. A month of training can represent ground truth. However, the training period data can be examined to verify that there were no extraordinary events during training period (e.g., known outages, major version update campaign, etc.). If such cases happen, they can be labeled so that the ML algorithm can adjust ground truth accordingly.

Signal QoS module 225b analyzes cellular signal quality at a particular location, which indicates what type of services a vehicle can receive at any time. An extremely low signal QoS can cause the car not to get any services. Yet, some levels of QoS may prevent only some of the more bandwidth or latency-related services from being affected. For example, real-time communication for autonomous cars requires extremely low latency. Therefore, it is crucial to understand if low signal QoS may prevent it. Attackers may interfere with signal quality to cause a DoS on a vehicle or a set of cars in a particular location. Such attacks may employ RF jamming, which can interfere in an area or change configuration on the vehicle modem to use the wrong signal parameters.

A typical communications network includes tens of thousands of cell towers as well as hundreds of millions of devices. QoS issues are part of a normal day to day events and local insignificant events are difficult to distinguish from more widescale QoS problems. An ML model would be provided RAN events data records, as well as aggregated signal strength and signal quality measurements for each cell tower. The ML model would output an alert when an abnormal event of QoS change takes place. The alert includes information about the geographical location, number of cell tower(s) affected, and an approximate number of cars affected. The alert may also include average QoS parameters that indicate the problem with QoS, such as power (RSRP) and quality (RSRQ). A ML model may require a minimum training period of one month. The ML model must learn common signal characteristics for each location. The ML model will cluster nearby cell towers with similar signal quality characteristics. The ML model classifies signal change types and labels them (severe weather, abnormal increase of the number of devices per cell tower, time of day, etc.). As the ML algorithm is based on unsupervised learning, a month of training can represent ground truth. Again, any extraordinary events that occur during the training period (such as known outages, high population events in a certain area such as Superbowl, etc.) can be labelled or excluded from the training data, so that the ML algorithm can adjust the ground truth accordingly.

Figure 2D:
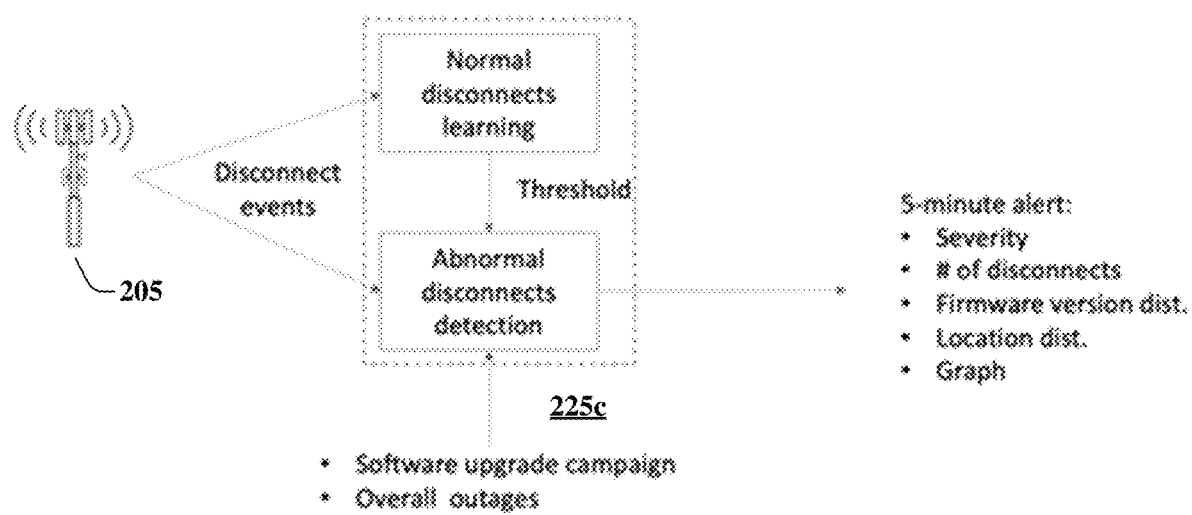
FIG. 2D is a block diagram illustrating exemplary massive disconnects module embedded within the mobility threat analytics platform of FIG. 2A in accordance with various aspects described herein.

FIG. 2D is a block diagram illustrating exemplary massive disconnects module embedded within the mobility threat analytics platform of FIG. 2A in accordance with various aspects described herein. Massive disconnects module 225c searches for large numbers of connected cars suddenly disconnecting from the communications network 220. Most connected cars are always connected to the communications network 220 or connected when the engine is on. Therefore, the expected behavior is to connect or disconnect from the network between zero to a few times a day. However, many disconnects of vehicles from a specific car brand that happen over the same period may indicate an attack.

The massive disconnects module 225c learns the regular rate of disconnects and manages a threshold for an alert. Furthermore, module 225c collects more parameters that can shed some light on the cause of the disconnects. The parameters include location and firmware version.

Additionally, the massive disconnects module 225c receives updates about planned maintenance campaigns such as software upgrades to exclude these from generating false alarms. Finally, a detection output is generated for a specific time interval, where the default value would be 5 minutes. A shorter interval provides a faster alert but may generate many false alarms. The alert includes:

The severity of the disconnects events.
The number of disconnects.
Distribution of software version firmware
The distribution of the location of the vehicles that generate the disconnects. The location report is from cell towers that received the disconnect message.

Attackers may want to cause a car to disconnect for either a DoS purpose or to hijack the connection. An example of the latter is when an attacker takes over a car's connection and injects a command to unlock the car to steal it.

The network includes tens of thousands of cell towers as well as hundreds of millions of devices. Disconnect issues are part of a normal day to day events, increasing the difficulty of distinguishing between local insignificant events to a more widescale disconnects that may be a part of an intentional attack. An ML model can characterize 'normal' disconnects events and alert when abnormal ones take place.

Input data for the ML model include RAN events data records. Events of data transmission aggregated for all cars for a vendor. Parameters include a timestamp, number of disconnect events, aggregated signal measurement report for all disconnects, modem software version, geographical distribution of disconnect events occurrences. The ML model outputs an alert about an abnormal massive disconnects event. Output parameters include a severity, a number of disconnects, a location and affected software versions.

The ML model may require a minimum training period of about a month so that sufficient data is collected. The ML model learns common patterns of disconnects events. The ML model may also discern an average rate, locations with higher disconnect rate, modem software versions that tend to have more disconnects.

The ML algorithm can be based on unsupervised learning, which assumes that the common case represents normal traffic. A month of training can represent ground truth. Any extraordinary events that occur during the training period (such as known outages, major version update campaigns, etc.) can be labelled or excluded from the training data so the algorithm would adjust the ground truth accordingly.

Returning to FIG. 2B, a firmware version anomalies module 225d monitors firmware software versions of the cellular modem 202, which typically range between 0-99. The software version changes whenever a vendor pushes out new firmware. Commonly, a particular vehicle brand has a few software versions at any given time since some models may need different firmware versions. Also, not all vehicles update a firmware version at the same time. A planned massive firmware upgrade is called an upgrade campaign. A firmware upgrade is usually done to either add more features or fix problems; these problems are often related to security vulnerabilities. The corresponding detection module creates a baseline of valid firmware versions. The firmware software version is obtained from the last two digits of the IMEISV, which is part of the identifiers a cellular device uses to communicate with the network. The detection module identifies firmware version anomalies of the following types:

Software version downgrade: a set of devices have their software version change to a lower number. A downgrade may be a valid event in the case where the vendor wants to revert to a previous version because of a faulty updated version. Still, a version downgrade is usually considered an abnormal event.

Odd version number: if one or more devices appear with software versions other than those in the baseline for a firmware software version, the module alerts the abnormal version. For example, a particular vehicle currently operates using firmware versions: 12, 15, and 16. If a set of cars suddenly appear with a version number of 66 then a determination can be made that this version number is unlikely to be valid; therefore, an alarm is raised.

Failed upgrade: this case happens when an upgrade campaign takes place. The campaign upgrades a current version to a newer one. After the campaign is over, some devices may remain in their previous version. This event may be due to an attacker preventing the upgrade for several devices, forcing them to stay with a vulnerable version to enable future attacks. The detection module can either identify an upgrade campaign or get a notification that such a campaign takes place.

Vulnerable software versions: a specific firmware software version may have vulnerabilities. A system can receive a notification of vulnerable software versions that would function as a blocked list. Whenever a vehicle reports that they use a vulnerable (banned) software version, the detection module would raise an alert.

Attackers may manipulate firmware software versions to cause a DoS effect or revert to a vulnerable version to launch their attacks more freely.

An APN mismatch module 225e monitors dedicated APN services for each vehicle brand. In practice, APN resembles a cellular service. There are few APN services for consumer phones such as the Internet, voice calls (IMS), and the 911 emergency service. For example, Volvo, Porsche, Subaru, or Tesla would each get their own dedicated set of APNs. Only vehicles from a particular brand are allowed to access the APN services of that vehicle brand. One type of anomaly is when a cellular device accesses an APN that belongs to a vehicle brand, and the device is not a vehicle of that brand. This event may indicate unauthorized access and should raise an alert immediately. The second type of anomaly is when a particular brand vehicle accesses an APN service that does not belong to its brand. The most likely result would be that the car will not get any service. Thus, it would appear as a DoS on the vehicle. The detection module maintains a list that matches APNs to certain vehicle brands. Each brand uses a unique set of device types identified by the first eight digits of their IMEI number, TAC.

If an attacker uses a non-vehicle cellular device to access a vehicle APN, the security implications are that the attacker can launch an attack on the APN server and cause an outage for the server. If an attacker alters a vehicle configuration to access an unauthorized APN, the vehicle will not get service.

A SIM card mismatch module 225f monitors a SIM card 203 that is part of the car (i.e., molded to the engine). It is not supposed to be switched or used in other cellular devices. The identity recorded in the SIM card represents the subscriber of the cellular carrier and, therefore, the car's corresponding policy and authorization to use network services. Attackers often try to clone or spoof the SIM card identity and impersonate the mobile subscriber to gain their authorization to network services. The corresponding detection module tracks all vehicles' international mobile subscriber id (IMSI) and compares them to the international mobile equipment id (IMEI) from the same transaction. Any mismatch between an IMSI and IMEI pair leads to an alert of a suspicious SIM card mismatch. For example, an IMSI 12121212 is known to be related to an IMEI 434343434343. If a transaction of this IMSI with a new IMEI 66666666666 comes up, then this transaction is an indication that the SIM card was used from a device that is not the original car. If the SIM card was spoofed, the module should expect to see the IMSI along with the original and new IMEI in an alternate way. If the SIM card were stolen, the module would only observe the new IMEI with the IMSI.

Hijacking an IMSI usually causes a DoS of the IMSI of the subscriber. Another security implication is that the attacker has access to the subscriber's account and may grant access to vehicle services. Furthermore, an attacker can intercept cellular messages of the subscriber and track the subscriber's location.

A location anomalies module 225g detects threats for a cellular device and a connected car where an attacker spoofs or hijacks the subscriber's identity—the network identity consists of the subscriber ID (IMSI) and the equipment ID (IMEI). Either one can be used to seize communication, track location, or cause a DoS on the device. One indication for such a hijack is a location anomaly. For example, if a connected car appears in two distant locations simultaneously or in a distance that is impossible to travel over a reasonable speed, this is defined as a location anomaly. In practice, a location anomaly means that the attacker is operating from a different location and impersonates the vehicle network ID. A cellular carrier can estimate a device's location by the cell tower it connects to at any given time. The location anomalies module 225g can alert on any such anomalous site.

A volumetric anomalies module 225h alerts when a device uses excessive traffic over a given period. The definition of excessive varies between different car brands and even between APNs of the same brand. For each APN of each brand, the detection module constructs a traffic usage pattern. Then, the module defines a threshold that indicates excessive usage, which is usually several times the standard deviation of the average traffic usage at any given time. Whenever the use of any vehicle exceeds the threshold, the module generates an alert. This module also receives feedback for its alerts and adjusts the threshold accordingly over time.

Excessive usage usually indicates fraudulent behavior. An example of such behavior is when a vehicle owner uses their vehicle as a home Wi-Fi hotspot, therefore abusing the car's data plan. Volumetric offenders can be found by matching to some threshold by a ML model. Still, it is normal that from time to time a car has some spike of traffic, and the system can learn to distinguish one-time events from repetitive ones. Also, some one-time events of a single car may be repetitive if comparing across many cars. The classification of such an event without knowing in advance its properties can require some multi-variant analysis or some neural network analysis such as auto encoder, to take into account the different variables that may have caused the spike in traffic.

The ML model may receive RAN events data records as input data. The events include data transmissions for each individual car. Parameters include timestamps, upload data volume, download data volume, and/or service/APN of the data. The ML model produces a periodic report (e.g., once a day or less) of a list of connected cars that had an abnormal volume of data usage. The report includes data upload and data download level of the offending car. Also, the report can include the average among all cars of a certain vendor and the monitored service. Further, a list of repetitive offenders can be identified and/or distributed, such as those who appeared in the report over a certain number of days over the past month (e.g., a default can be 5 days).

In an embodiment, the ML model is trained over a minimum training period of one month. The ML model learns statistical characteristics of data usage, including average volume per time of day, average volume per location, standard deviation, traffic trends (increase/decrease). Typically, a volumetric anomaly comprises a volume usage that is higher than an average by more than 1,000 times standard deviation. Also, since the number of offenders is insignificant in terms of an overall average calculations, unless there is an epidemic of offenses, training is not likely interfered with. The ML algorithm can be based on unsupervised learning. A common reading is assumed to be normal traffic. A month of training data can represent ground truth. Any extraordinary events during training time (e.g., known outages, major version update campaign) can be verified. If such cases happen, they can be labeled so the algorithm would adjust ground truth accordingly.

A signaling storms module 225i monitors for a cellular modem 202 that has been corrupted. One way to deny network service from a cellular device is to corrupt its configuration in such a way that causes it to attach and detach from the network continuously. Signaling storms module 225i can identify this anomaly by detecting cellular devices that constantly attach or re-attach procedures followed by a network detach. This type of behavior is not allowed by cellular standards (i.e., 3GPP). Instead, the standards require the cellular device to wait between network-attach attempts. This behavior indicates some kind of fault in the device or malicious activity. The security implications of such an attack that corrupts a device configuration causes the device to re-attach continuously to the network, thereby generating a DoS of the device and potentially overloading the network.

SMS messages have a different purpose when utilized for connected cars than for consumer phones. SMS messages are mainly used for control purposes between the cellular carrier or the car vendor and the vehicle. SMS is sometimes considered a more reliable alternative to the Internet and therefore is used for relaying crucial messages from the car. These SMS messages differ between different vehicle brands. They transmit operational data from the vehicle and update configuration files in the car's computer. For other brands, SMS may be used to unlock the vehicle's door or transfer a route from the phone to the car's navigation system. In several cases, attackers have used the SMS channel to control essential vehicle systems (such as breaks, doors, or even wipers). Some other cases show that SMS may be used as a control channel to relay commands to device with pre-installed malware at the vehicle computer. Either way, monitoring SMS messages source and patterns is essential when dealing with cellular IoT devices and connected cars.

SMS module 225j builds a normal-behavior pattern for each connected car brand monitored. A pattern of parameters includes a phone number used for the SMS server that communicates with the car, frequency of messages sent, and message size. Usually, an allowed list of numbers can engage in SMS communication with a particular car brand. Therefore, any number outside the allowed list may raise an alert.

The security implications of an SMS attack include a compromised SMS channel, which implies that attackers can control sensitive systems of the vehicle remotely. Also, attackers can disclose vehicle location or cause a DoS of the vehicle connectivity.

A ML algorithm can learn characteristics of some events triggered by SMS messages. For example, remote starter ignition volume usually increases during winter mornings in areas of the northeast coast, since people want to warm their car. This leads to a significant increase in SMS texts, yet this phenomenon is expected and can be identified by the ML algorithm. Input data for the ML algorithm include call detail records and event data records of SMS messages for each car. Parameters may include a timestamp, mobile originated (MO) or mobile terminated (MT) message (e.g., did the car receive or send text), frequency of messages per car, overall volume of messages, and/or time of day.

A trained ML model will generate as output an alert on SMS messages originated or terminated by non-authorized numbers or an alert on an abnormal rate of SMS messages sent to a specific car (potential DoS). The ML model may be trained on a month of data (or other time period) to learn statistical characteristics of frequency and volume of SMS messages sent to and from cars (MO/MT). The ML model may also learn participating phone numbers as well as short code numbers sending texts. The ML model will characterize unauthorized numbers involved in messaging.

The ML algorithm is based on unsupervised learning. A month of training can represent ground truth. If there are extraordinary events during training time (e.g., known outages), they can be labeled so the algorithm would adjust ground truth accordingly.

Figure 2E:
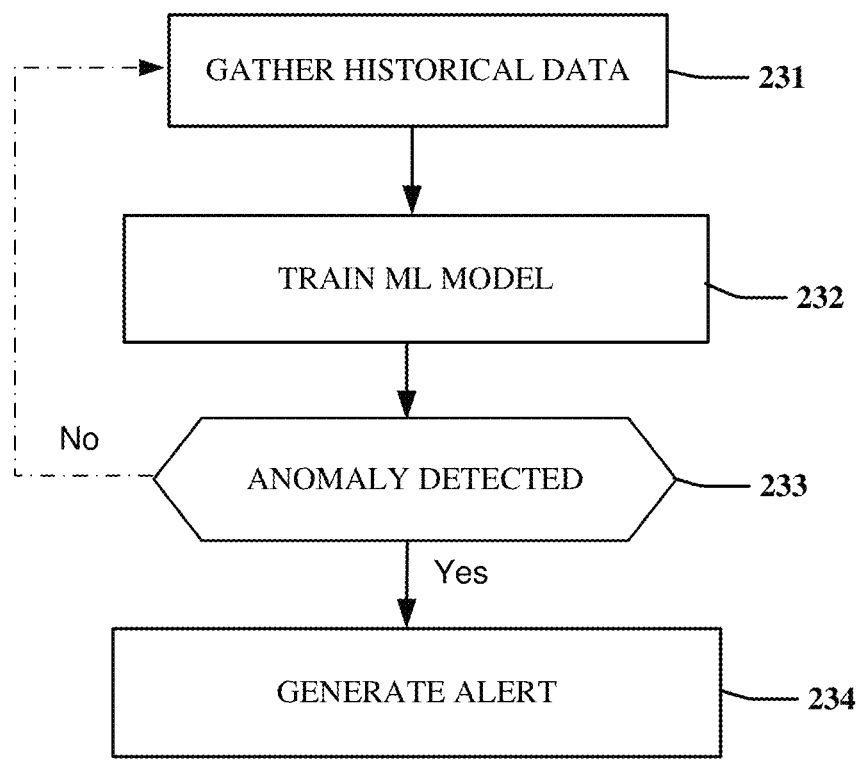
FIG. 2E depicts an illustrative embodiment of a method in accordance with various aspects described herein.

FIG. 2E depicts an illustrative embodiment of a method in accordance with various aspects described herein. As shown in FIG. 2E, method 230 begins in step 231 where the MTAP system gathers historical data for training various ML models associated with the parameters monitored. MTAP gathers both user data from the APNs and control data from the APNs and packet core. Next in step 232, the ML models are trained to recognize anomalies in the data. Then in step 233, the MTAP system monitors current data to determine whether an anomaly is detected. If so, then in step 234, the system generates an alert reporting the anomaly. If no anomalies are detected, the system may optionally continue to train the ML model, or merely continue to monitor the current data.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
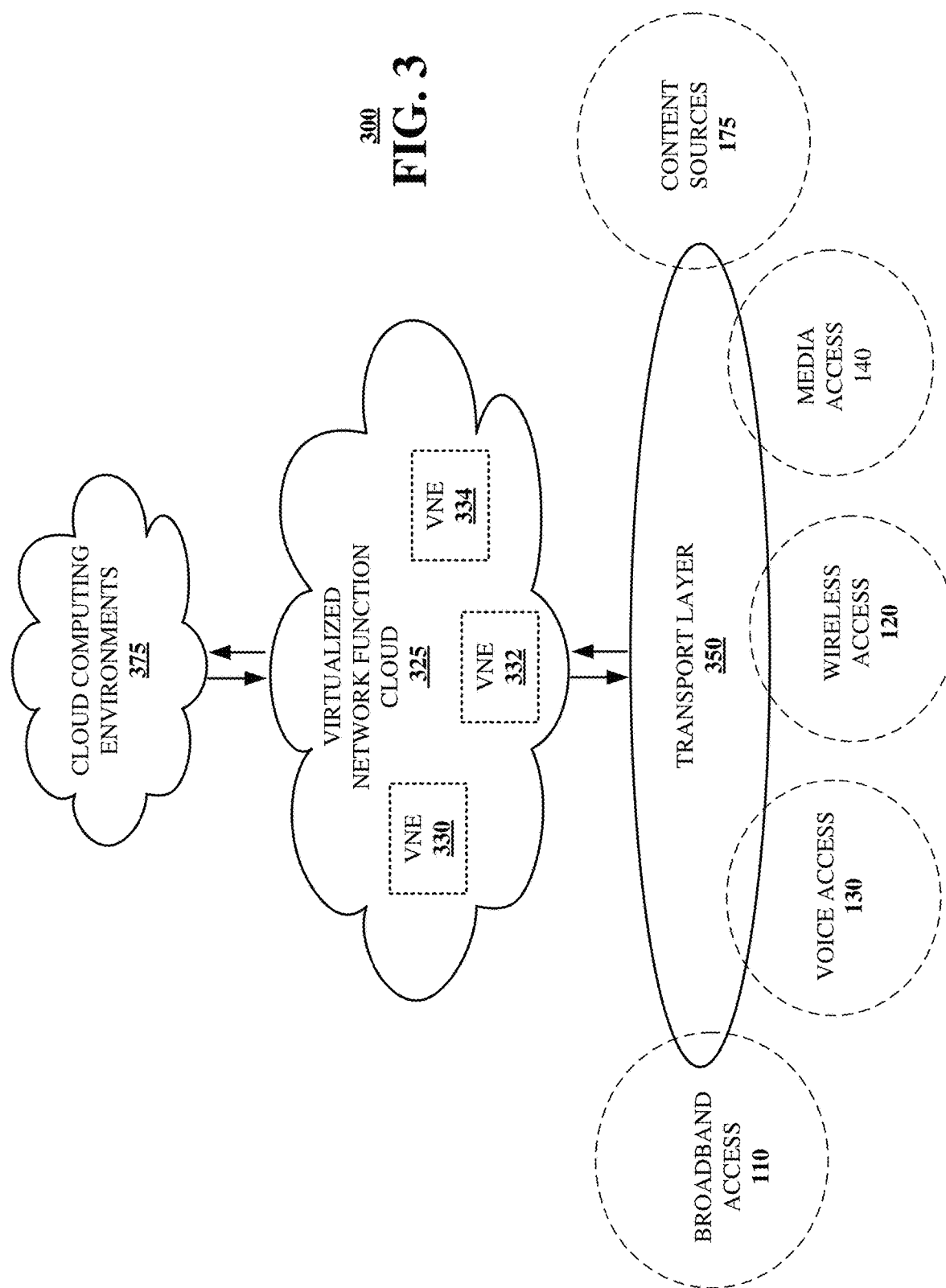
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, 2D, 2E and 3. For example, virtualized communication network 300 can facilitate in whole or in part gathering and aggregating historical data provided to an APN gateway of a connected car manufacturer; using the historical data gathered and aggregated to train a ML model to recognize anomalies from the historical data, thereby creating a trained ML model; monitoring current data provided to the APN gateway; and generating an alert when the trained ML model recognizes an anomaly.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
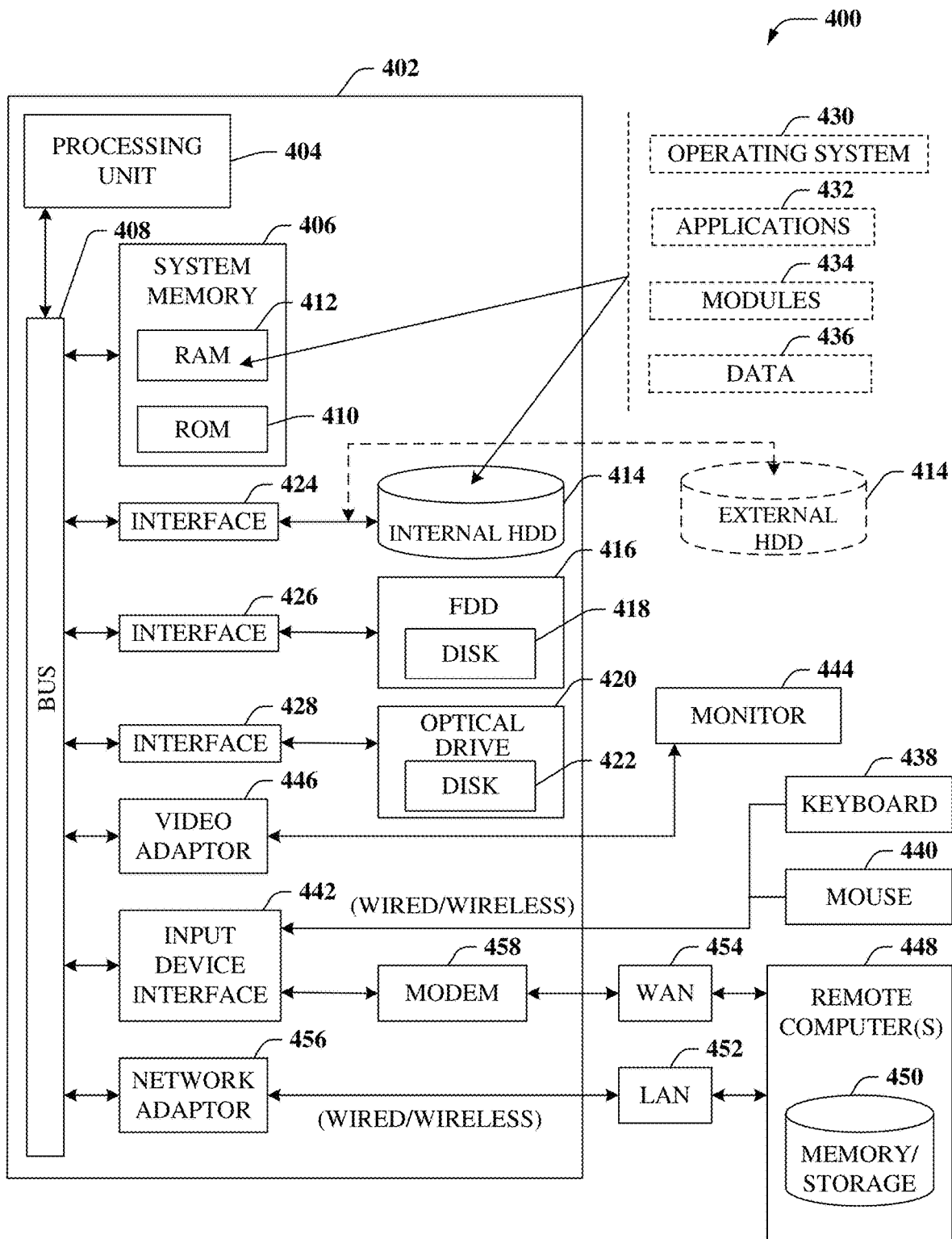
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part gathering and aggregating historical data provided to an APN gateway of a connected car manufacturer; using the historical data gathered and aggregated to train a ML model to recognize anomalies from the historical data, thereby creating a trained ML model; monitoring current data provided to the APN gateway; and generating an alert when the trained ML model recognizes an anomaly.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
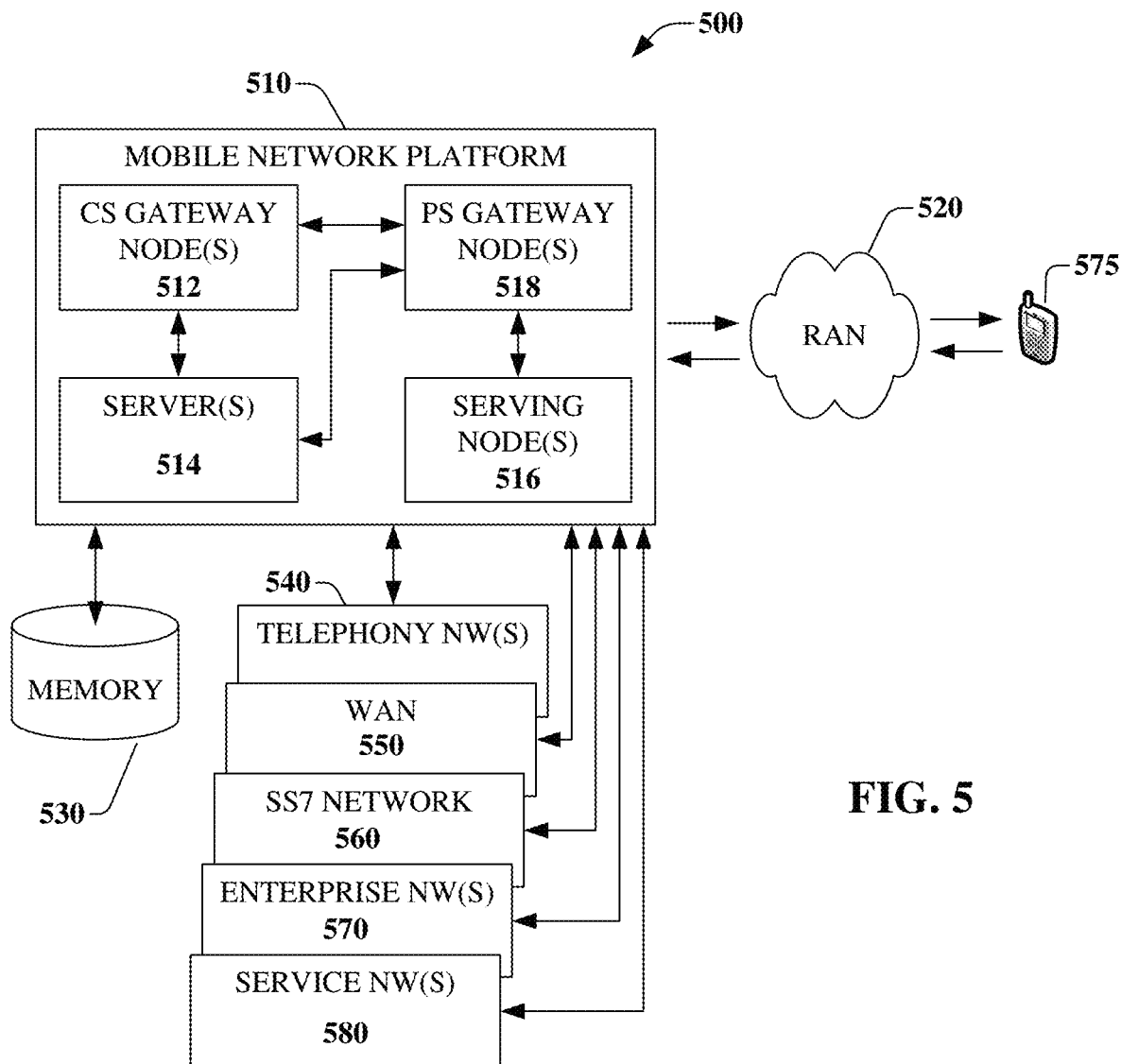
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part gathering and aggregating historical data provided to an APN gateway of a connected car manufacturer; using the historical data gathered and aggregated to train a ML model to recognize anomalies from the historical data, thereby creating a trained ML model; monitoring current data provided to the APN gateway; and generating an alert when the trained ML model recognizes an anomaly.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
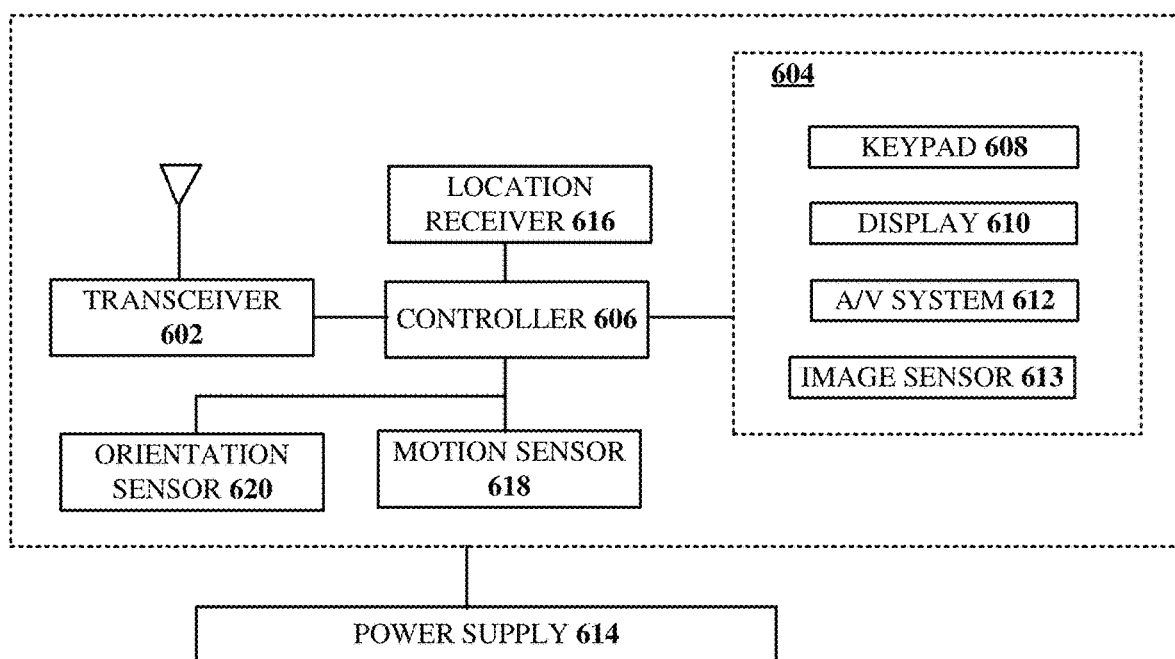
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part gathering and aggregating historical data provided to an APN gateway of a connected car manufacturer; using the historical data gathered and aggregated to train a ML model to recognize anomalies from the historical data, thereby creating a trained ML model; monitoring current data provided to the APN gateway; and generating an alert when the trained ML model recognizes an anomaly.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for conducting various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
gathering and aggregating historical data provided to an access point name (APN) gateway of a connected car manufacturer and a packet core of a communications network, wherein the historical data includes control plane data, and wherein the control plane data identifies authentication and network attack attempts, APN mismatches, and subscriber identity module (SIM) card mismatches;
using the historical data gathered and aggregated to train a machine-learning (ML) model to recognize anomalies from the historical data, thereby creating a trained ML model;
monitoring current data provided to the APN gateway and the packet core; and
generating, based on the monitoring, an alert when the trained ML model recognizes an anomaly in the current data, wherein the anomaly comprises signal quality of service issues, massive disconnects, short message service inconsistencies, location-related issues, and firmware version anomalies.

2. The device of claim 1, wherein the historical data comprises radio access network data, data plane data, or a combination thereof.

3. The device of claim 2, wherein the APN gateway comprises a telematics APN gateway.

4. The device of claim 3, wherein the data plane data comprises GPS data, onboard vehicle diagnostic data, wireless telematics device data, event data recorder data, or a combination thereof.

5. The device of claim 4, wherein the historical data is gathered for a month or more.

6. The device of claim 5, wherein the anomaly comprises extreme changes in data volume.

7. The device of claim 6, wherein the alert is generated less frequently than every fifteen minutes.

8. The device of claim 1, wherein the alert is generated less frequently than every five minutes.

9. The device of claim 5, wherein the processing system comprises a plurality of processors operating in a distributed computing environment.

10. A non-transitory, machine-readable medium, comprising executable instructions that, when executed by a processing system including a processor, facilitate performance of operations, the operations comprising:
collecting historical data provided to an access point name (APN) gateway of a connected car manufacturer, wherein the historical data includes control plane data, and wherein the control plane data identifies authentication and network attack attempts, APN mismatches, and subscriber identity module (SIM) card mismatches;
training a machine-learning (ML) model to recognize anomalies from the historical data, thereby creating a trained ML model;
monitoring current data provided to the APN gateway; and
generating a report identifying an anomaly in the current data recognized by the trained ML model, wherein the anomaly comprises signal quality of service issues, massive disconnects, short message service inconsistencies, location-related issues, and firmware version anomalies.

11. The non-transitory, machine-readable medium of claim 10, wherein the APN gateway comprises a telematics APN gateway, an entertainment APN gateway, an Internet hotspot APN gateway, or a combination thereof.

12. The non-transitory, machine-readable medium of claim 11, wherein the historical data and the current data comprises GPS data, onboard vehicle diagnostic data, wireless telematics device data, event data recorder data, or a combination thereof.

13. The non-transitory, machine-readable medium of claim 12, wherein the historical data is gathered for thirty days or more.

14. The non-transitory, machine-readable medium of claim 13, wherein the anomaly comprises extreme changes in data volume.

15. The non-transitory, machine-readable medium of claim 14, wherein an alert is generated less frequently than every fifteen minutes.

16. A method, comprising:
collecting, by a processing system including a processor, historical data provided to an access point name (APN) gateway of a connected car manufacturer, wherein the APN gateway comprises a telematics APN gateway, an entertainment APN gateway, an Internet hotspot APN gateway, or a combination thereof, wherein the historical data includes control plane data, and wherein the control plane data identifies authentication and network attack attempts, APN mismatches, and subscriber identity module (SIM) card mismatches;
training, by the processing system, a machine-learning (ML) model to recognize anomalies from the historical data, thereby creating a trained ML model;
monitoring, by the processing system, current data provided to the APN gateway; and
generating, by the processing system, an alert when the trained ML model recognizes an anomaly in the current data, wherein the anomaly comprises signal quality of service issues, massive disconnects, short message service inconsistencies, location-related issues, and firmware version anomalies.

17. The method of claim 16, wherein the anomaly comprises: a first set of cars having a software version downgrade, a second set of cars having a software version that is different from a baseline version, and a third set of cars failing to upgrade from a current software version to a newer software version.

18. The method of claim 16, wherein the trained ML model includes unique network characteristics of each of a plurality of car brands.

19. The method of claim 16, further comprising:
 detecting, by the processing system, a first anomaly in the current data relating to a specific device; and
 detecting, by the processing system, a second anomaly in the current data relating to an entire car population of a particular car make.

20. The method of claim 16, wherein the current data captures malware or botnet connections.

* * * * *